United States Patent
Fukuda et al.

(10) Patent No.: US 7,333,436 B2
(45) Date of Patent: Feb. 19, 2008

(54) NETWORK DEVICE WITH TRAFFIC SHAPING FUNCTIONS AND BANDWIDTH CONTROL METHOD USING LEAKY BUCKET ALGORITHM

(75) Inventors: Nobuyuki Fukuda, Yokohama (JP); Tatsuji Hamamura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 610 days.

(21) Appl. No.: 11/034,630

(22) Filed: Jan. 13, 2005

(65) Prior Publication Data

US 2006/0067233 A1    Mar. 30, 2006

(30) Foreign Application Priority Data

Sep. 28, 2004    (JP)    ............................. 2004-282415

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl. ................................. 370/235.1
(58) Field of Classification Search ................ 370/235, 370/229
See application file for complete search history.

(56) References Cited

U.S. PATENT DOCUMENTS 6,404,737 B1 * 6/2002 Novick et al. ........... 370/235.1
6,556,578 B1 * 4/2003 Silberschatz et al. ....... 370/412
6,829,649 B1 * 12/2004 Shorey et al. .............. 709/235
6,909,693 B1 * 6/2005 Firoiu et al. ................ 370/235
2003/0002438 A1 * 1/2003 Yazaki et al. ............... 370/229
2003/0007454 A1 * 1/2003 Shorey ....................... 370/229
2003/0214954 A1 * 11/2003 Oldak et al. ................ 370/400
2004/0071086 A1 * 4/2004 Haumont et al. ........... 370/230
2004/0120252 A1 * 6/2004 Bowen et al. .............. 370/229

FOREIGN PATENT DOCUMENTS

JP    2000-083052    3/2000

\* cited by examiner

*Primary Examiner*—Hassan Kizou
*Assistant Examiner*—Jianye Wu
(74) *Attorney, Agent, or Firm*—Katten Muchin Rosenman LLP

(57) ABSTRACT

A network device with bandwidth usage control functions using a leaky bucket algorithm to provide a traffic service conforming to given user parameters. A leaky bucket counter produces a new leaky-bucket (LB) count at predetermined cell slot intervals by adding an output rate parameter to the previous count, and then by subtracting therefrom a full rate parameter if a cell output request signal is active. An upper limit calculator determines an upper limit for such LB count values, and a count modifier applies this upper limit, thereby producing a modified LB count. When the modified LB count from the count modifier equals or exceeds an output reference value, a comparator activates an output timing signal, which permits transmission of a pending cell in a buffer.

18 Claims, 14 Drawing Sheets

NETWORK DEVICE WITH TRAFFIC SHAPING FUNCTIONS AND BANDWIDTH CONTROL METHOD USING LEAKY BUCKET ALGORITHM

CROSS-REFERENCE TO RELATED APPLICATIONS

This application is based on, and claims priority to, Japanese Application No. 2004-282415, filed Sep. 28, 2004, in Japan, and which is incorporated herein by reference.

BACKGROUND OF THE INVENTION

1. Field of the Invention

The present invention relates to network devices with traffic shaping functions, as well as to bandwidth control methods using leaky bucket algorithms. More particularly, the present invention relates to a network device having bandwidth control functions to transport cells, as well as to a bandwidth control method for controlling bandwidth usage at the source end on the basis of leaky bucket algorithms.

2. Description of the Related Art

Asynchronous Transfer Mode (ATM) is a high performance, cell-based data transmission technique widely used in our communications infrastructure. ATM networks offer a mechanism to control the traffic load by limiting the rate of ingress cells flowing into the network. Such bandwidth control functions ensure that data traffic on a particular connection will not exceed the bandwidth usage limit that has previously been declared. This feature is called "Usage Parameter Control" (UPC), and the leaky bucket algorithm is commonly used to implement UPC functions.

FIG. 14 shows the concept of leaky bucket algorithm. The leaky bucket analogy refers to a bucket with a hole near the bottom that causes it to leak at a constant rate when water is poured into the bucket and the water level reaches a certain level. If the inflow rate exactly matches with the leak rate, the water level remains constant. If water is supplied at a slower or faster rate, the water level drops or rises accordingly.

The supply of water refers to incoming traffic of cells, and the water level means the amount of cells stored in a buffer. The leak from the bucket represents an average cell rate that is previously declared. The bucket depth corresponds to a tolerance parameter, and a massive burst of incoming cells could result in an overflow from the bucket. Those excessive packets would normally be discarded since they are regarded as a violation of the agreed traffic rate.

In the actual implementation of traffic policing with a leaky bucket algorithm, the leaky bucket is realized as a counter that goes up at given cell slot intervals and goes down each time a cell is sent out to the network. This counter is referred to as the leaky bucket counter.

Conventional communications techniques using leaky bucket algorithm include the one disclosed in Japanese Patent Application Publication No. 2000-83052, where paragraphs Nos. 0023 and 0024 and FIG. 3 are particularly relevant. To stabilize packet transport, the proposed packet communications system identifies characteristics of received packet traffic through measurement and provides notification of non-conforming packets, if any. More specifically, a traffic monitor with a leaky bucket counter is placed at the receiving end to detect non-conforming cells. When the count exceeds a threshold, the cells received at that time are regarded as violating MBS requirements specified in the corresponding traffic contract. The monitoring mechanism feeds this alert information back to a preceding controller to police the flow of cells. It should be noted that cells are monitored at the receiving end, not at the sending end. The problem of this control method is that it allows excessive cells to actually travel over the transmission line, thus leading to an increase in traffic load.

Because of its flexible user bandwidth control, ATM is suitable for transporting various kinds of information, including voice, video, and computer data. ATM networks support different traffic service profiles each specifying user parameters such as maximum burst size (MBS), cell delay variation tolerance (CDVT), peak cell rate (PCR), and sustainable cell rate (SCR). MBS specifies the maximum number of burst cells that can be transmitted at the PCR. CDVT gives a tolerance for the delay of cells when they are transmitted at the PCR that is specified for each particular connection. SCR denotes an average cell rate that each particular connection requires.

Conventional bandwidth control methods, however, do not use a leaky bucket mechanism in providing traffic service with MBS, CDVT, and SCR parameters. Instead, they employ a dedicated control circuit for each parameter of MBS, CDVT, and SCR. This approach increases circuit size and reduces processing speeds.

SUMMARY OF THE INVENTION

In view of the foregoing, it is an object of the present invention to provide a network device with bandwidth control functions using a leaky bucket algorithm to offer an improved traffic service conforming to given user parameters.

It is another object of the present invention to provide a bandwidth control method that shapes traffic using a leaky bucket algorithm to offer an improved traffic service conforming to given user parameters.

To accomplish the first object stated above, the present invention provides a network device having bandwidth control functions to transport cells. This network device comprises a cell buffer, a cell count manager, a leaky bucket controller, and a cell output enable logic. The cell buffer stores received cells and outputs one of the stored cells each time a cell output request signal becomes active. The cell count manager provides a stored cell count that indicates the number of cells stored in the cell buffer. The leaky bucket controller controls bandwidth usage at a source end by using a leaky bucket algorithm. To this end, the leaky bucket controller comprises a leaky bucket counter, an upper limit calculator, a count modifier, a comparator, and a cell output enable logic. The leaky bucket counter calculates a leaky-bucket (LB) count at predetermined cell slot intervals by adding an output rate parameter to a modified LB count, and by subtracting therefrom a full rate parameter if the cell output request signal is active. The upper limit calculator determines an upper limit for LB count values, and the count modifier limits the LB count to that upper limit. This limited LB count is referred to as a modified LB count. When the modified LB count from the count modifier equals or exceeds an output reference value, the comparator activates an output timing signal, which permits the cell output enable logic to activate the cell output request signal when the stored cell count is one or more.

To accomplish the second object stated above, the present invention provides a method for controlling bandwidth usage at a source end by using a leaky bucket algorithm. This method comprises the following steps: (a) calculating a leaky-bucket (LB) count at predetermined cell slot intervals by adding an output rate parameter to a modified LB count, and by subtracting therefrom a full rate parameter if a cell output request signal is active, (b) setting at least one of maximum burst size, cell delay variation tolerance, and sustainable cell rate; (c) calculating an upper limit for the LB count when the maximum burst size or cell delay variation tolerance is set at the setting step (b); (d) producing a first modified LB count by limiting the LB count not to exceed the upper limit; (e) comparing the LB count with an output reference value when the sustainable cell rate is set at the setting step (b); (f) producing a second modified LB count by limiting the LB count not to exceed the output reference value when the LB count exceeds the output reference value and when the stored cell count is zero; and (g) outputting a cell when the first or second modified LB count equals or exceeds the output reference value.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
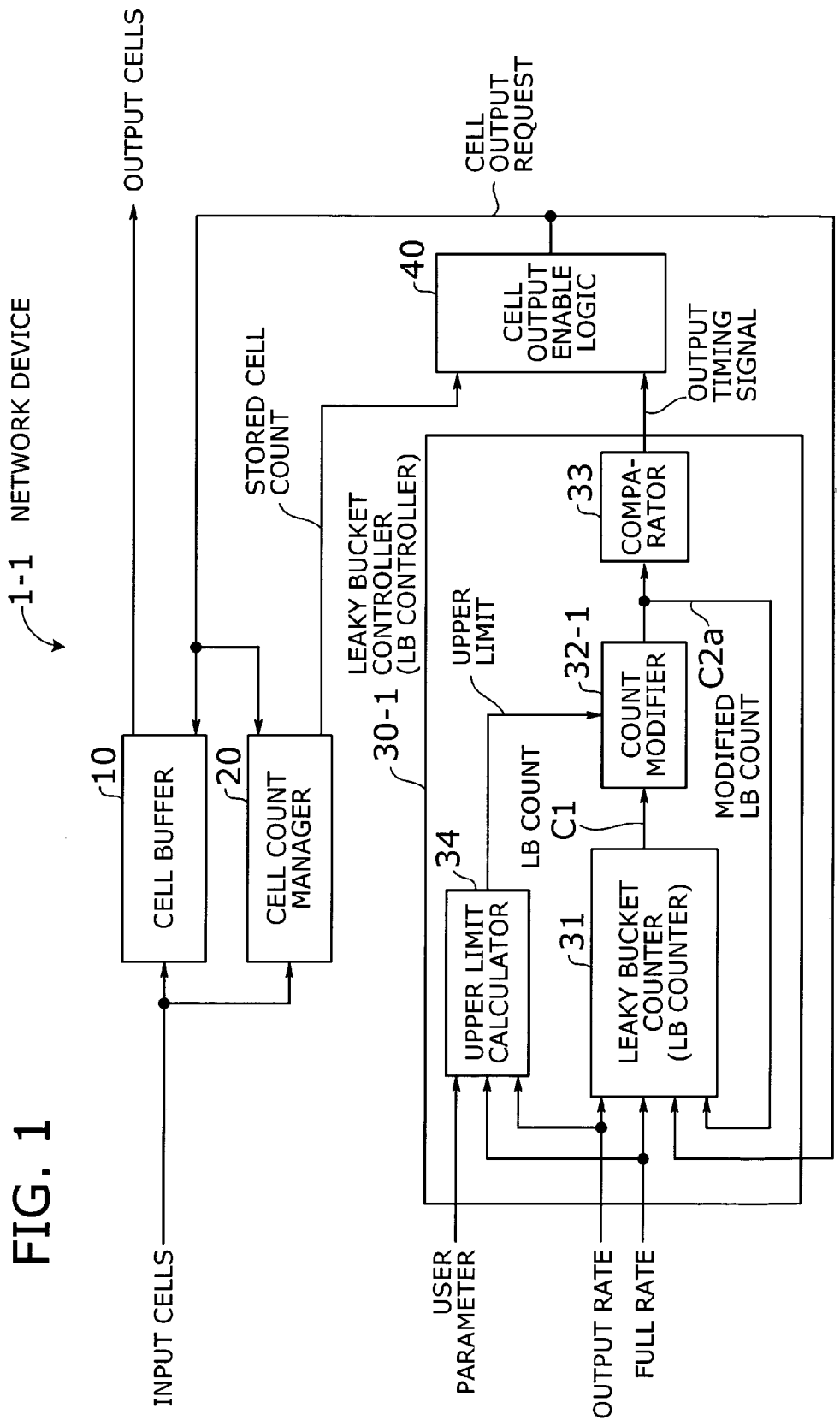
FIG. 1 is a conceptual view of a network device according to the present invention.

Preferred embodiments of the present invention will be described below with reference to the accompanying drawings, wherein like reference numerals refer to like elements throughout.

FIG. 1 is a conceptual view of a network device according to the present invention. To support bandwidth control for transport of fixed-length cells over an ATM network, this network device 1-1 has a cell buffer 10, a cell count manager 20, a leaky bucket (LB) controller 30-1, and a cell output enable logic 40. The bandwidth control functions support maximum burst size (MBS) and/or cell delay variation tolerance (CDVT) at the sending end. (The proposed network device 1-1 can also be applied to an IP packet network as will be described later in a separate section.)

The cell buffer 10 stores received cells and outputs them, one by one, each time an active cell output request signal comes from the cell output enable logic 40. The cell count manager 20 watches incoming cells entering the cell buffer 10, as well as the cell output request signal from the cell output enable logic 40, to manage the number of cells stored in the cell buffer 10. This number is referred to herein as the "stored cell count."

The LB controller 30-1 is formed from an LB counter 31, a count modifier 3-1, a comparator 33, and an upper limit calculator 34. The LB counter 31 serves as a leaky bucket shaper that gives a smooth flow of cells on a particular connection so as to satisfy the service-level agreement regarding that connection. Specifically, the LB counter 31 adds a given output rate parameter to a modified LB count C2a at specified cell slot intervals, thereby producing an LB count value C1. The LB counter 31 further subtracts a full rate parameter from that LB count C1 when the cell output request signal is active. The "output rate" means the rate at which cells are sent out of a network device. The term "full rate" refers to maximum transmission rate, or peak cell rate (PCR), on the present connection.

The upper limit calculator 34 calculates an upper limit for LB count values C1 that the LB counter 31 can produce. This calculation is based on a specified user parameter (MBS or CDVT), output rate parameter, and full rate parameter. Details will be described later with reference to a specific formula.

The count modifier 32-1 produces a modified LB count C2a by modifying the LB count C1 from the LB counter 31 according to a predetermined rule. "Modifying" means "limiting the maximum count" in the context of the present embodiment. More specifically, when the LB counter 31 outputs an LB count C1 that exceeds the upper limit given from the upper limit calculator 34, the count modifier 32-1 sets C2a to that upper limit, instead of substituting C1 for C2a. If the current LB count C1 is not greater than the upper limit, the count modifier 32-1 outputs C1 as is.

The comparator 33 compares the modified LB count C2a with an output reference value that is internally set. If the former is equals or exceeds the latter, the comparator 33 asserts an output timing signal. Otherwise, it does not activate the signal.

The cell output enable logic 40 supplies a cell output request signal to the cell buffer 10, cell count manager 20, and LB counter 31. Specifically, it activates this cell output request signal when the output timing signal from the comparator 33 is active and when the stored cell count indicates that the cell buffer 10 stores one or more cells. The cell output enable logic 40 does not send a cell output request signal when the output timing signal is inactive or when there are no stored cells in the cell buffer 10.

With the structure described above, the network device 1-1 determines an upper limit for LB count values from a specified set of user parameter, output rate parameter, and full rate parameter. The network device 1-1 uses this upper limit to shape cell traffic with the leaky bucket algorithm to fulfill the requirements of MBS or CDVT. Operation of the network device 1-1 will be discussed in detail later with reference to FIG. 4 and subsequent diagrams.

Leaky Bucket Controller

Figure 2:
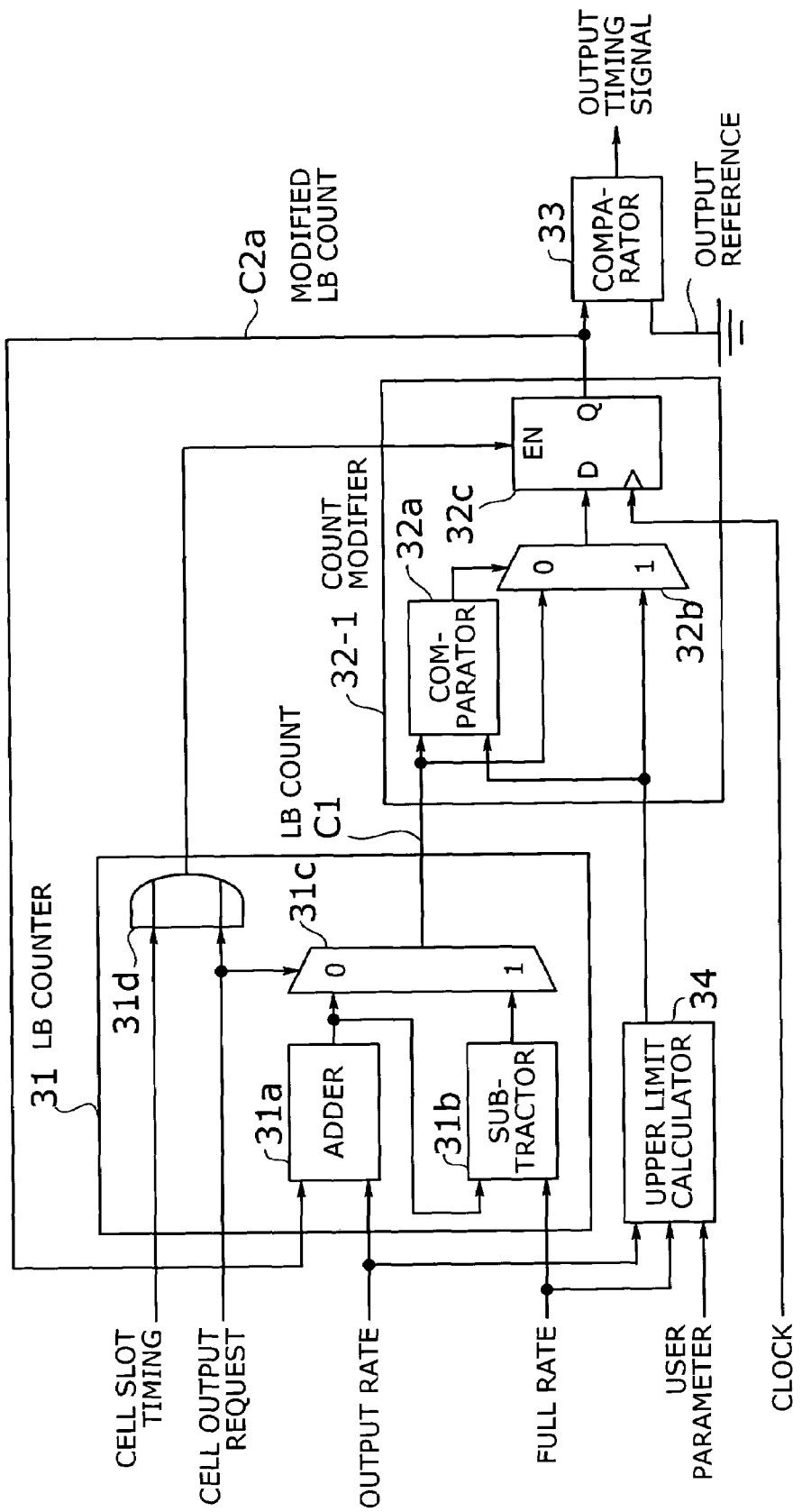
FIG. 2 shows the structure of an LB controller.

Referring now to FIG. 2, the structure of the LB controller 30-1 will be described below. As can be seen from FIG. 2, the LB controller 30-1 has an LB counter 31, a count modifier 32-1, a comparator 33, and an upper limit calculator 34. The LB counter 31 includes an adder 31a, a subtractor 31*b*, a selector 31*c*, and an OR gate 31*d*. The count modifier 32-1 includes a comparator 32*a*, a selector 32*b*, and a register 32*c*.

Inside the LB counter 31, the adder 31*a* adds a given output rate parameter to the current modified LB count C2*a* every time a new cell slot comes. The resulting sum is supplied to port #0 of the selector 31*c* and the subtractor 31*b*. The subtractor 31*b* subtracts a given full rate parameter from the sum and gives the resulting difference to port #1 of the selector 31*c*. The selector 31*c* chooses its port #1 (i.e., subtractor output) when the cell output request signal is asserted to "H" (high) level. It selects port #0 (i.e., adder output) when the cell output request signal is negated to "L" (low) level. The selected value is referred to as LB count C1. The OR gate 31*d*, on the other hand, produces a logical sum signal between the cell slot timing signal and cell output request signal.

Then in the count modifier 32-1, the comparator 32*a* compares the LB count C1 with the upper limit produced by the upper limit calculator 34. If it is found that C1 has reached the upper limit, the comparator 32*a* outputs a high-level signal, and if not, it produces a low-level signal. The selector 32*b* receives the LB count C1 at port #0 and the upper limit at port #1. The selector 32*b* chooses its port #1 (i.e., upper limit) when the comparator 32*a* gives a high-level selection signal. When the comparator 32*a* gives a low-level selection signal, the selector 32*b* selects its port #0 (i.e., LB count C1).

The register 32*c*, operating on a clock signal, receives the output of the selector 32*b* at its D (data) input port. This data is taken into the register 32*c* when EN (enable) input is driven to a high level by the logical sum output of the OR gate 31*d*. The latched data that appears at its output port Q is sent to the comparator 33 and adder 31*a* as a new modified LB count C2*a*. The comparator 33 compares this modified LB count C2*a* with a given output reference value, which is zero (the ground symbol in FIG. 2 analogously represents a value of zero) If the modified LB count is zero or more, the comparator 33 sends out an output timing signal at a high level. If the modified LB count is minus, the output timing signal is inactive.

Figure 3:
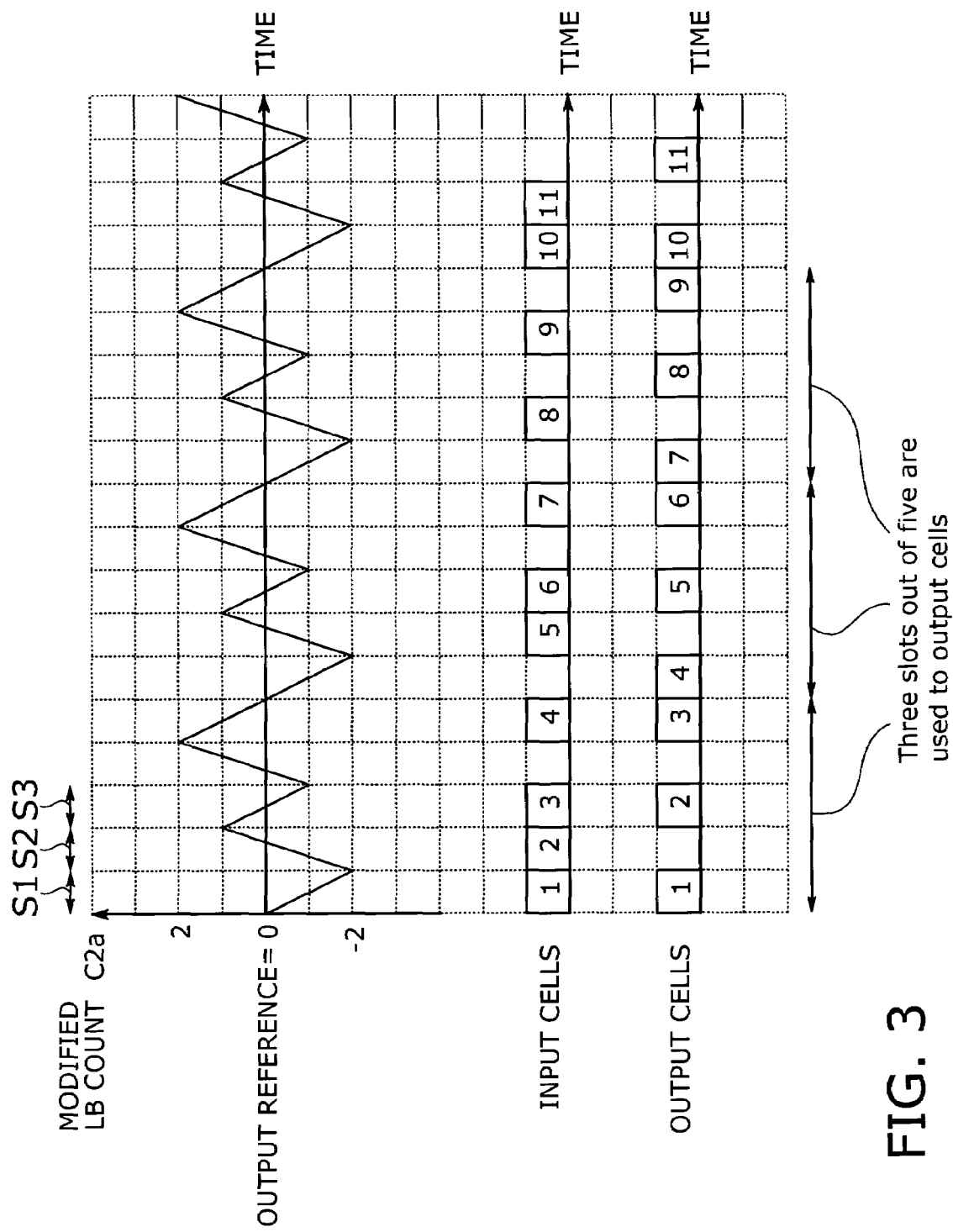
FIG. 3 shows how the LB count would behave when there is no set upper limit.

Referring next to FIG. 3, the following will describe how the above LB controller 30-1 operates. For explanatory purposes, let us assume first that no upper limit is set to the LB controller 30-1 in controlling a given user parameter. With this hypothetical setup, the LB count C1 is supplied directly from the selector 31*c* to D port of the register 32*c*, meaning that C1 always equals C2*a*.

FIG. 3 shows how the LB count would behave when there is no set upper limit. Shown at the upper part of FIG. 3 is a line graph illustrating how the modified LB count C2*a* varies with time. It is assumed that the full rate parameter is set to 5 (i.e., 5 Mbps), and that the output rate parameter is set to 3 (i.e., 3 Mbps). The output reference is zero bps. Shown in the lower half of FIG. 3 are a series of input cells and a series of consequent output cells. Specifically, the first three cell intervals are as follows:

(S1) Cell #1 arrives. Initially the modified LB count C2*a* is set to zero, and thus the condition of C2*a*≧0 is true. This permits the cell buffer 10 to output the entered cell #1 immediately.

More specifically, the comparator 33 activates the output timing signal, and the cell count manager 20 indicates that there is one pending cell in the cell buffer 10. The cell output enable logic 40 thus issues a cell output request to cause the cell buffer 10 to output cell #1. The adder 31*a*, on the other hand, outputs a value of three (C2*a*=0 plus output rate=3), and the subtractor 31*b* subtracts 5 (full rate parameter) from that adder output. Since the cell output request signal is active at this moment, the selector 31*c* chooses the subtractor output at port #1 and outputs an LB count C1 of −2.

(S2) Cell #2 arrives. Now that the modified LB count C2*a* has changed to −2, and it is below the output reference value, no cells are allowed to go out of the cell buffer 10.

More specifically, cell #2 should stay in the cell buffer 10, since the output timing signal being negated by the comparator 33 prevents the cell output enable logic 40 from issuing a cell output request. The adder 31*a*, on the other hand, adds 3 to the current modified LB count C2*a*, thus producing a value of +1. Because the cell output request signal is low, the selector 31*c* chooses the adder output at port #0 and therefore outputs +1 as a new LB count C1.

(S3) Cell #3 arrives. The modified LB count C2*a* now becomes +1, satisfying again the condition of C2*a*≧0 at the comparator 33. This permits the cell buffer 10 to output the previously stored cell #2. The adder 31*a* then adds 3 to the current modified LB count C2*a*, and the subtractor 31*b* subtracts 5 from the resulting sum. Since the cell output request signal is now active, the selector 31*c* chooses its port #1 and outputs a new LB count C1 of −1.

As can be seen from the above example, the value of output rate parameter is added to the modified LB count C2*a* every time a new cell slot comes. The resulting sum becomes a new modified LB count C2*a* when no cells are output. When a cell is output, the full rate parameter is subtracted from the sum to give a smaller value to the modified LB count C2*a*. The LB controller 30-1 continues controlling the LB count in the this way in order to limit the bandwidth usage of a particular user connection. That is, in the example of FIG. 3, the user is allocated a bandwidth of 3 Mbps (output rate) out of an available bandwidth of 5 Mbps (full rate). As seen from FIG. 3, the LB controller 30-1 uses only three cell slots out of five slots in forwarding ingress cells to the network.

MBS Control

This section describes how the network device 1-1 achieves MBS control. The term "MBS control" refers to a traffic shaping function that limits the maximum length of a burst of cells according to a specified MBS parameter. When, for example, the parameter allows transmission of a five-cell long burst at the rate of PCR, the network device 1-1 controls the flow of cells transmitted back to back such that no bursts will violate the specified maximum length of five cells.

Let Rmax be a full rate parameter specified in units of bps, and Rout be an output rate parameter in units of bps. Suppose also that a maximum burst size MBS is given as a user parameter in units of cells. For MBS control, the upper limit calculator 34 sets an upper limit Lmax in units of bps according to the following formula (1):

$$Lmax=(Rmax-Rout)\times(MBS-1) \quad (1)$$

where Rmax≧Rout and MBS≧2. Note that the output rate Rout and full rate Rmax are actually specified as SCR and PCR parameters, respectively.

Figure 4:
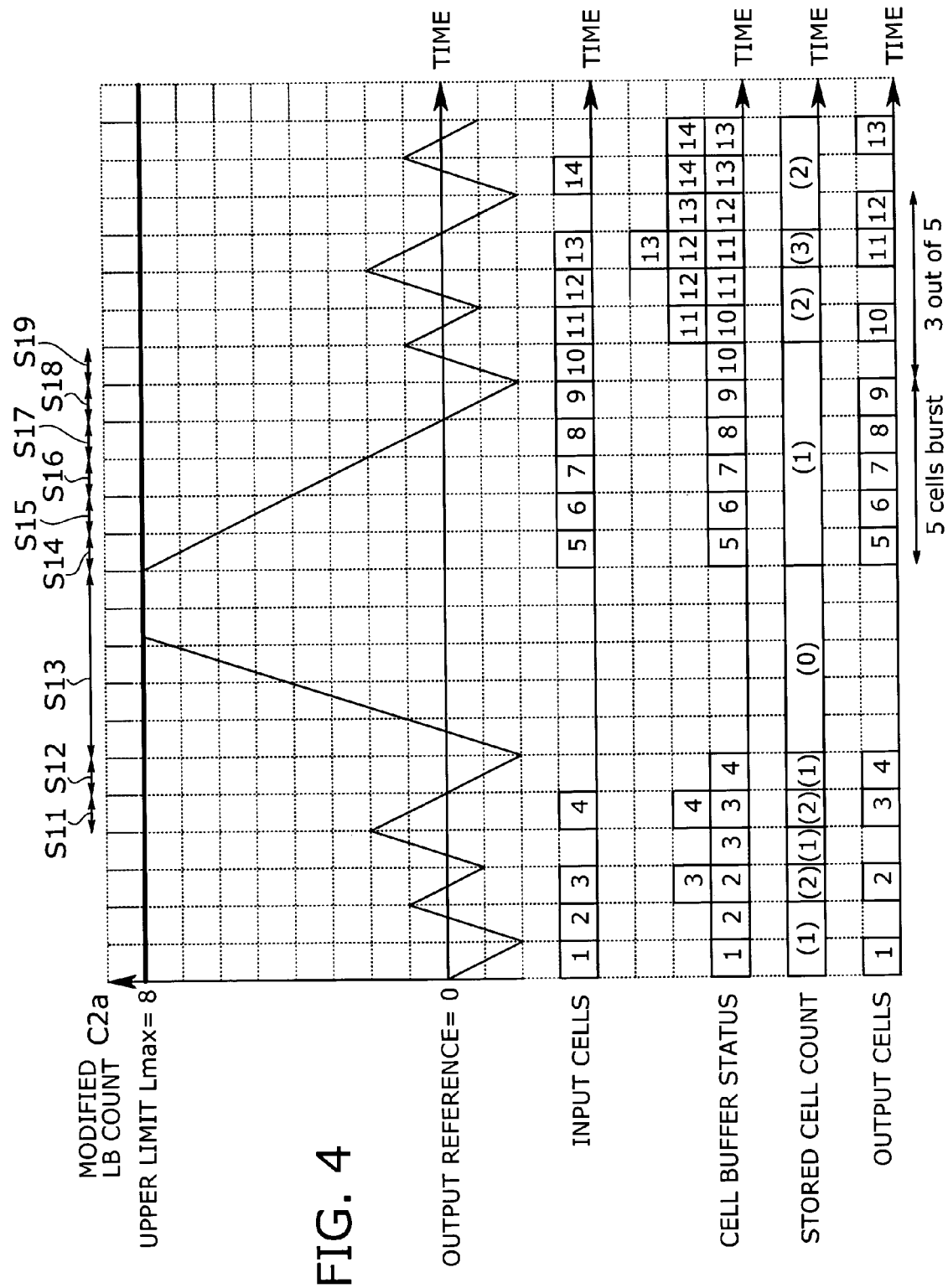
FIG. 4 shows how MBS control is achieved.

FIG. 4 shows how MBS control is achieved. The upper half gives a line graph illustrating how the modified LB count C2a varies with time, while the lower half shows input cells, cell buffer status, stored cell count, and output cells. In FIG. 4, all input cells are serially numbered, and the cell buffer status actually gives the serial numbers of pending cells in the cell buffer 10. The stored cell count in parentheses shows the number of those cells in the cell buffer 10. As already mentioned, FIG. 4 assumes a full rate of 5 Mbps, an output rate of 3 Mbps, and a maximum burst size of 5 cells. The formula (1) then yields an upper limit of Lmax=8. The following explanation skips the first four slots and begins with the arrival of cell #4.

(S11) Cell #4 arrives. As seen from the cell buffer status, the cell buffer 10 now contains two cells #3 and #4. Since the LB count C1 is +2 at this moment, and it is below the upper limit, the count modifier 32-1 sets the modified LB count C2a to +2 without modification. This positive value (+2) of C2a exceeds the output reference value of zero (i.e., satisfies the condition of C2a≧0), which permits the comparator 33 to send an output timing signal. Accordingly, the cell buffer 10 outputs the previously stored cell #3. The LB counter 31 now updates the LB count C1 with a value of zero by adding 3 (output rate parameter) to C2a=2 and subtracting 5 (full rate parameter) from that sum, thus updating the LB count C1 with a new value of zero.

(S12) The stored cell count has decreased to one, and the cell buffer 10 stores one cell #4 as seen from the cell buffer status. Since the LB count C1 is zero at this moment, and it is below the upper limit, the count modifier 32-1 outputs C1 as a new modified LB count C2a without modification. This zero-valued C2a still satisfies the condition C2a≧0 for the comparator 33 to send an active output timing signal. Accordingly, the cell buffer 10 outputs cell #4. The LB counter 31 now adds 3 to C2a=0 and subtracts 5 from that sum, thus updating the LB count C1 with a new value of −2.

(S13) There has been no cell traffic for a five-slot period since the last cell was transmitted at step S12. The LB counter 31 repeats adding the output rate value of +3 even in this period, but no subtraction takes place because of the absence of cells to be sent out. The LB count C1 soon reaches the upper limit of +8, after which C1 stays at that level because the count modifier 32-1 keeps applying the limit to it. This eventually stops the counting operation of the LB counter 31, holding the modified LB count C2a at the level of +8 until an active cell output request arises.

(S14) Cell #5 arrives. The cell buffer 10 now contains cell #5 as the cell buffer status shows, and the stored cell count increases to one. Since the LB count C1 is +8 at this moment, and it equals the upper limit, the count modifier 32-1 substitutes +8 for the modified LB count C2a (actually, C2a is unchanged). The condition of C2a≧0 is satisfied at the comparator 33, which enables the stored cell #5 to be sent out of the cell buffer 10 immediately. The LB counter 31 now adds 3 to +8 and subtracts 5 from that sum, thus updating the LB count C1 with a new value of +6.

(S15) Cell #6 arrives. The cell buffer 10 now contains cell #6, and the stored cell count is set to one. Since the LB count C1 is +6 at this moment, and it is below the upper limit, the count modifier 32-1 assigns this value of +6 as a new modified LB count C2a. This new value (+6) of C2a satisfies the condition of C2a≧0 at the comparator 33, thus enabling the cell buffer 10 to output cell #6 immediately. The LB counter 31 now adds 3 to C1=+6 and subtracts 5 from that sum, thus updating the LB count C1 with a new value of +4.

(S16) Cell #7 arrives. The cell buffer 10 now contains cell #7, and the stored cell count is set to one. Since the LB count C1 is +4 at this moment, and it is below the upper limit, the count modifier 32-1 substitutes +4 for the modified LB count C2a. This new value (+4) of C2a satisfies the condition of C2a≧0 at the comparator 33, thus enabling the cell buffer 10 to output cell #7 immediately. The LB counter 31 now adds 3 to C2a=+4 and subtracts 5 from that sum, thus updating the LB count C1 with a new value of +2.

(S17) Cell #8 arrives. The cell buffer 10 now contains cell #8, and the stored cell count is set to one. Since the LB count C1 is +2 at this moment, and it is below the upper limit, the count modifier 32-1 substitutes +2 for the modified LB count C2a. This new value of C2a satisfies the condition of C2a≧0 at the comparator 33, thus enabling the cell buffer 10 to output the stored cell #8 immediately. The LB counter 31 now adds 3 to C2a=+2 and subtracts 5 from that sum, thus updating the LB count C1 with a new value of zero.

(S18) Cell #9 arrives. The cell buffer 10 now contains cell #9 as the cell buffer status shows, and the stored cell count is set to one. Since the LB count C1 is zero at this moment, and it is below the upper limit, the count modifier 32-1 substitutes zero for the modified LB count C2a. This new value of C2a still satisfies the condition of C2a≧0 at the comparator 33, thus enabling the cell buffer 10 to output cell #8 immediately. The LB counter 31 now adds 3 to C2a=0 and subtracts 5 from that sum, thus updating the LB count C1 with a new value of −2.

(S19) Cell #10 arrives. The cell buffer 10 now contains cell #10, and the stored cell count is set to one. Since the LB count C1 is −2 at this moment, and it is below the upper limit, the count modifier 32-1 substitutes −2 for the modified LB count C2a. This negative value (−2) of C2a fails to satisfy the condition of C2a≧0 at the comparator 33, thus preventing cells from going out of the cell buffer 10. The LB counter 31 now adds 3 (output rate parameter) to C2a=−2, thus updating the LB count C1 with a new value of +1.

In this way, the MBS control permits a burst of five cells to be transmitted at the rate specified by the PCR parameter. A burst occurs when the LB count C1 has reached the upper limit determined by formula (1), and ends when the LB count C1 falls below the output reference value. After the burst is finished, the cell rate is controlled in accordance with a given SCR parameter, until C1 rises up to the limit again. That is, cells are transmitted at the rate of three slots out of five.

Figure 5:
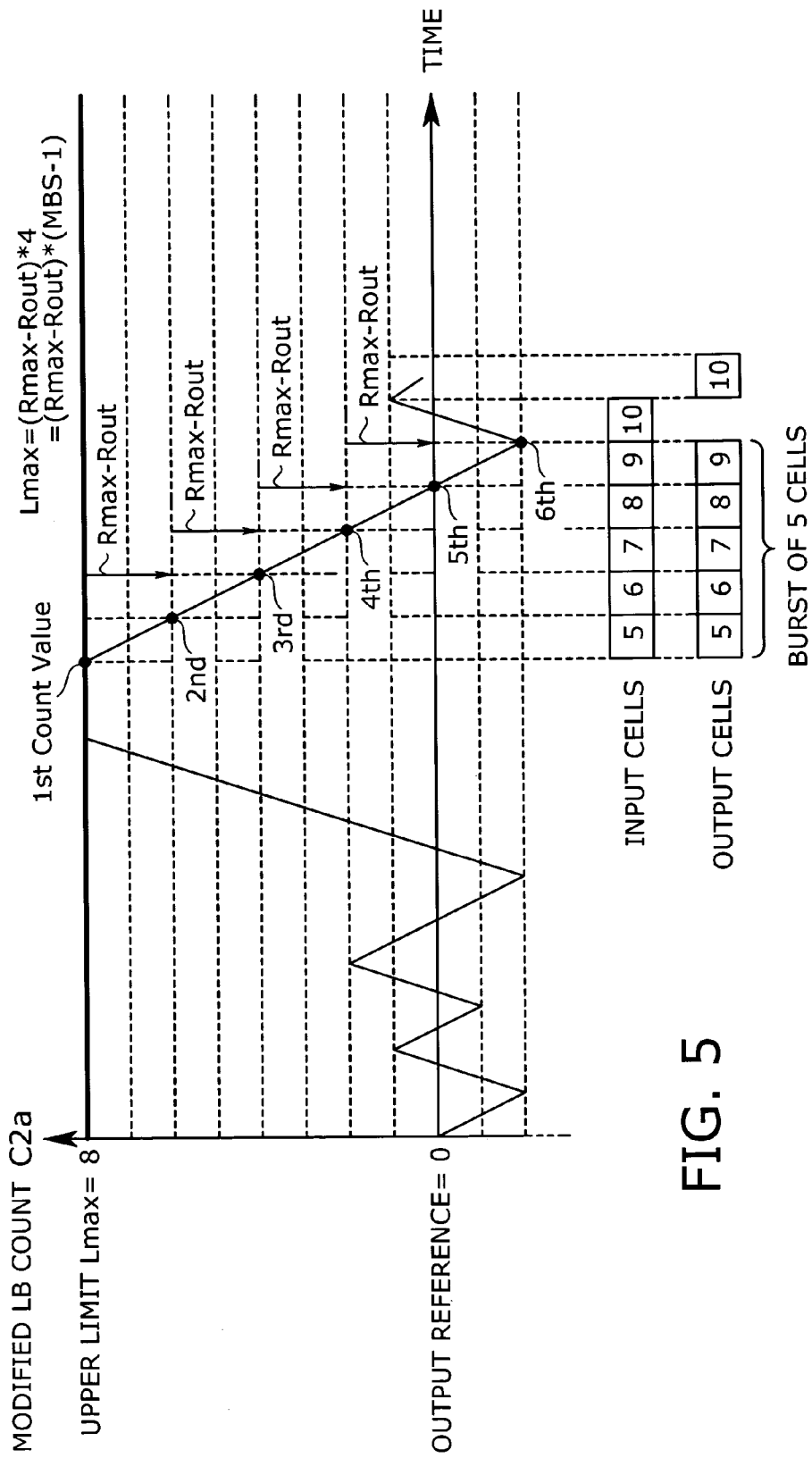
FIG. 5 explains what the formula of MBS upper limit means.

FIG. 5 explains what formula (1) of MBS upper limit actually means. The illustrated line graph is a copy of the upper half of FIG. 4. Here, to limit the burst size to five cells is to stop the sixth cell after five cells are transmitted back to back. To achieve this with the LB controller 30-1 of FIG. 2, the upper limit must satisfy the following two conditions. First, the upper limit has to be large enough to keep the LB count C1 equal to or above the output reference value (zero) for a continuous period of five cell slots. Second, the upper limit has to be small enough to make the LB count C1 fall below the output reference value at the sixth cell. Since the LB counter 31 reduces the LB count C1 by 2 (i.e., Rmax−Rout) at cell slot intervals during a burst, the above two conditions can be satisfied if the upper limit is set to a value that becomes exactly zero by repeating this subtraction four times. Notice here that the number of repetitive subtractions should be (MBS−1). This is where the formula (1) comes from. In other words, the MBS control is achieved by setting an upper limit Lmax such that the output reference value will be reached by subtracting (Rmax−Rout) from Lmax (MBS−1) times.

As can be seen from the above explanation, the proposed network device 1-1 is designed to control the maximum burst size of cells at the source end by placing an upper limit for LB count values. Unlike the present invention, conventional MBS control is implemented at the receiving device, where a long burst of incoming cells that exceeds a predetermined LB count threshold is regarded as a violation of MBS requirements, and such excessive cells are therefore discarded. The problem is that those excessive bursts of cells actually travel over the network, increasing the traffic load and wasting network resources.

According to the present invention, the network device 1-1 manages MBS of cells at the source end by setting an appropriate upper limit in handling bursty traffic of ingress cells even after a long blank period. This upper limit is used to stop counting operation in shaping traffic with a leaky bucket algorithm, which is essentially different from the conventional LB count threshold in terms of the functions that they play. The proposed network device 1-1 never transmits excessive burst cells that could violate MBS requirements. This feature contributes to quality improvement of network service.

CDVT Control

Figure 6A:
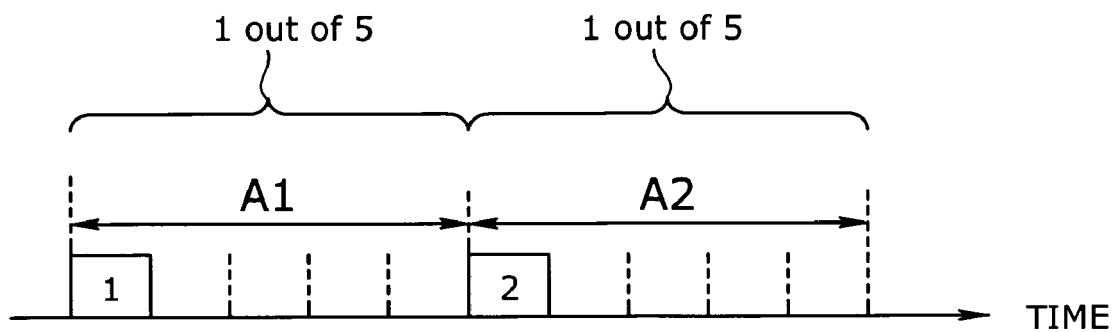
FIGS. 6A and 6B show the concept of CDVT control implemented in a network device.
Figure 6B:
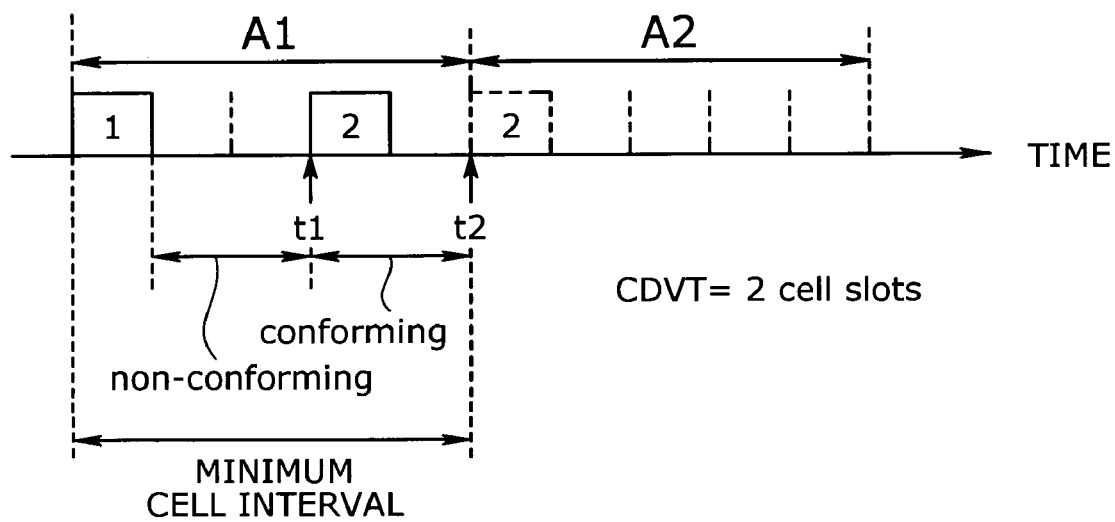

This section describes how CDVT control is achieved. FIGS. 6A and 6B explain the concept of CDVT control implemented in the network device 1-1 according to the present invention. In the case that the output rate parameter is set to 1 cell/s and that the full rate parameter is set to 5 cell/s, a network device normally transmits cells at a rate specified by an SCR parameter, i.e., using one of five cell slots to send each cell. Theoretically, one cell is transmitted in a first 5-slot section A1 and another cell is transmitted in a second 5-slot section A2, as shown in FIG. 6A.

The source network device shapes the traffic with a CDVT parameter of k in the above situation. CDVT=k means that a cell can be transmitted k slots earlier than its theoretical transmission time. Suppose, for example, that cell #2 in FIG. 6B is supposed to be transmitted at time t2. When CDVT is set to two cell slot intervals, the source network device is allowed to send this cell #2 at time t2, two slots earlier than t1. That is, the requirement of minimum cell interval (i.e., the expected time interval between two consecutive cells) can be relaxed temporarily by the time specified by CDVT. FIG. 6B also indicates a non-conforming period of two cell slots. A cell transmitted in this period (i.e., earlier than time t1) would be penalized due to the violation of CDVT.

Suppose now that a cell delay variation tolerance CDVT is given as a user parameter in units of seconds. For CDVT control, the upper limit calculator 34 calculates an upper limit Lmax in units of bps from the following formula (2):

$$Lmax = Rout \times \frac{CDVT}{T} \quad (2)$$

where Rout is an output rate parameter given in units of bps, and T represents time in units of seconds.

Figure 7:
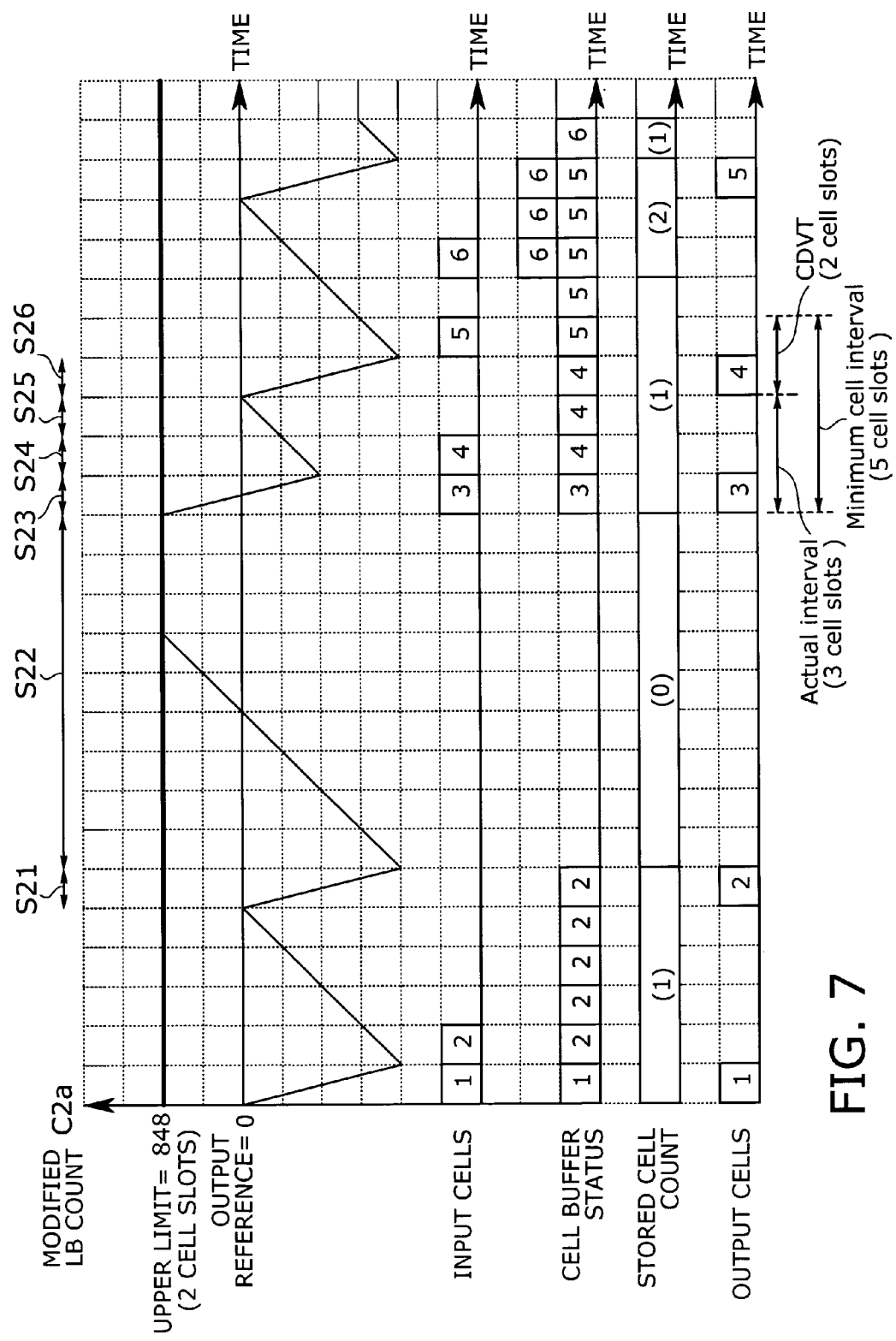
FIGS. 7 and 8 show how the traffic is shaped with a given CDVT parameter.

FIG. 7 shows an example of how the traffic is shaped with a given CDVT parameter. The upper half gives a line graph illustrating how the modified LB count $C2a$ varies with time, while the lower half shows input cells, cell buffer status, stored cell count, and output cells. This graph assumes the same condition as in FIG. 6; that is, the cell slot interval is 1 s, and CDVT is set to 2 s (or 2 cell slots). Also assumed is an output rate (or physical rate) Rout of 424 bps (or 1 cell/s) and a full rate (PCR) of 2120 bps (or 5 cell/s).

Specifically, with Rout=424, CDVT=2, and T=1, formula (2) yields an upper limit Lmax of 848, which is equivalent to 2 cell slots. The following explanation skips the first five cell slots and begins with the outputting of cell #2.

(S21) The cell buffer 10 stores cell #2 as seen from the cell buffer status, and the stored cell count has been one. Since the current LB count C1 is zero, and it is below the upper limit, the count modifier 32-1 outputs C1=0 as a new modified LB count $C2a$ without modification. This zero-valued $C2a$ satisfies the condition of $C2a \geq 0$ at the comparator 33, which enables the cell buffer 10 to output cell #2. The LB counter 31 now adds 1 (output rate parameter) to $C2a$=0 and subtracts 5 (full rate parameter) from the resulting sum, thus updating the LB count C1 with a new value of −4.

(S22) There has been no cell traffic for nine slots since the last cell was transmitted at step S21. The LB counter 31 continues adding the output rate value of +1 during this period, but no subtraction takes place because of the absence of cells to be sent out. The LB count C1 soon reaches the upper limit of +2, after which C1 stays at that level because the count modifier 32-1 keeps applying the limit to it. This eventually stops the counting operation of the LB counter 31, holding the modified LB count $C2a$ at the level of +2 until an active cell output request arises.

(S23) Cell #3 arrives. As the cell buffer status shows, the cell buffer 10 now contains cell #3, and the stored cell count is set to one. Since the LB count C1 is +2 at this moment, and it equals the upper limit, the count modifier 32-1 sets +2 to the modified LB count $C2a$ (actually, $C2a$ is unchanged). This value of $C2a$ satisfies the condition of $C2a \geq 0$ at the comparator 33, which enables the cell buffer 10 to output the stored cell #3 immediately. The LB counter 31 now adds 1 (output rate parameter) to $C2a$=+2 and subtracts 5. (full rate parameter) from that sum, thus updating the LB count C1 with a new value of −2.

(S24) Cell #4 arrives. The cell buffer 10 now contains cell #4, and the stored cell count is set to one. Since the LB count C1 is −2 at this moment, and it is below the upper limit, the count modifier 32-1 assigns −2 as a new modified LB count $C2a$. This negative value (−2) of $C2a$ does not satisfy the condition of $C2a \geq 0$ at the comparator 33, which prevents cell #4 from going out of the cell buffer 10. The LB counter 31 now adds 1 (output rate parameter) to $C2a$=−2, thus updating the LB count C1 with a new value of −1.

(S25) The cell buffer 10 accommodates cell #4 as seen from the cell buffer status, and the stored cell count is set to one. Since the current LB count C1 is −1, and it is below the upper limit, the count modifier 32-1 outputs C1=−1 as a new modified LB count $C2a$ without modification. This negative value (−1) of $C2a$ does not satisfy the condition of $C2a \geq 0$ at the comparator 33, which maintains the pending status of cell #4 in the cell buffer 10. The LB counter 31 adds 1

(output rate parameter) to C2a=−1 again, thus updating the LB count C1 with a new value of zero.

(S26) The cell buffer 10 still stores cell #4, and the stored cell count is one. Since the LB count C1 is zero at this moment, and it is below the upper limit, the count modifier 32-1 outputs C1=0 as a new modified LB count C2a without modification. Now that this zero-valued C2a satisfies the condition of C2a≧20 at the comparator 33, the cell buffer 10 can output cell #4. The LB counter 31 adds 1 (output rate parameter) to C2a=0 and subtracts 5 (full rate parameter) from that sum, thus updating the LB count C1 with a new value of −4.

As can be seen from the above example, the CDVT control mechanism using the upper limit formula (2) permits cell #4 to be transmitted two slots earlier than its nominal output time in conformity with the given CDVT parameter (CDVT conformity in this particular case means that the interval between cell #3 and cell #4 must be at least three cell slots). The above-described CDVT control enables more efficient use of an available traffic bandwidth.

Figure 8:
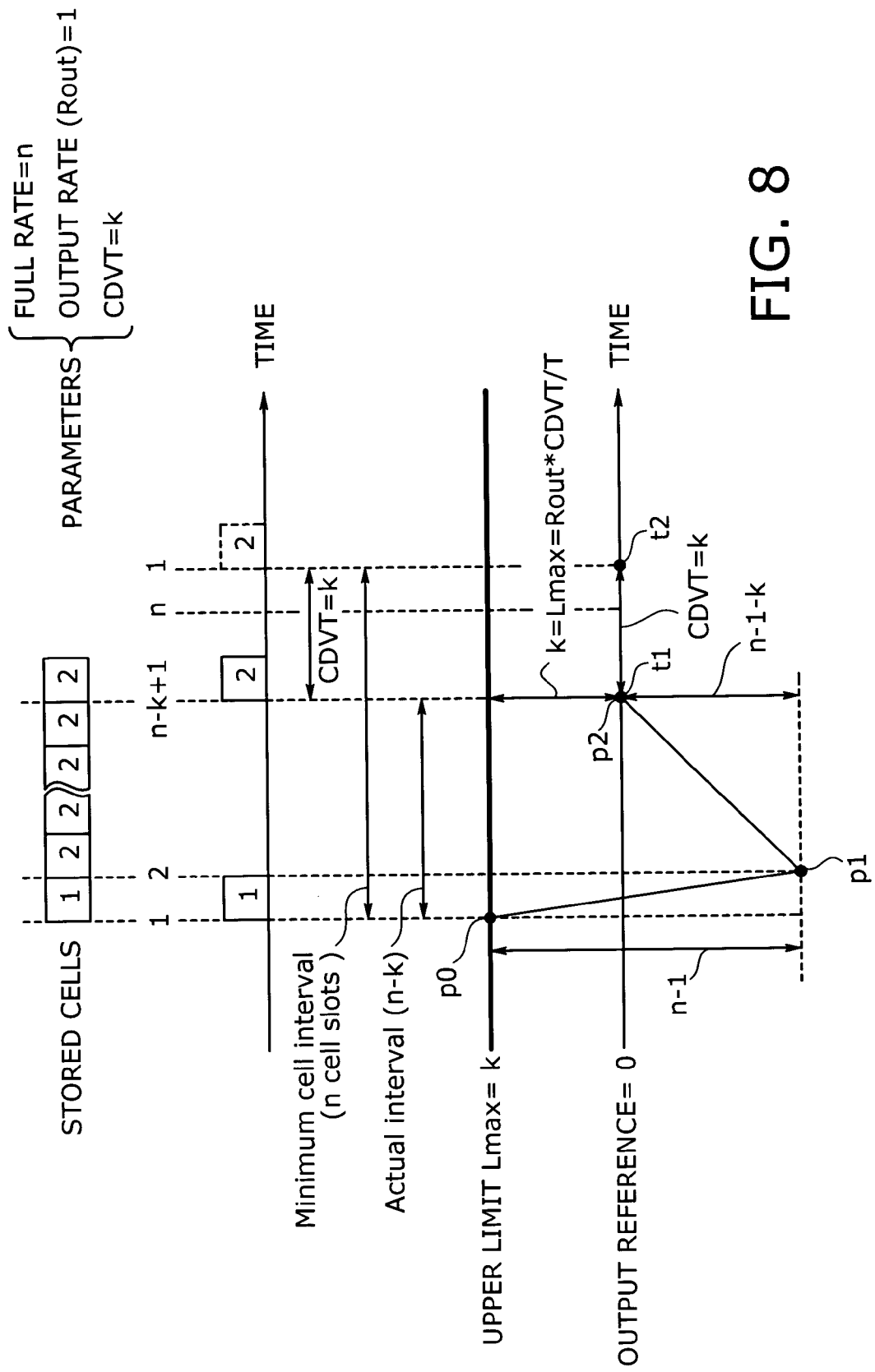

FIG. 8 gives a more generalized explanation about how CDVT is implemented in the proposed LB controller 30-1. Here we assume Rmax=n (full rate), Rout=1 (output rate), and CDVT=k (CDV tolerance). With those parameters, formula (2) yields an upper limit Lmax of k. Referring to FIG. 8, the dotted box indicates cell #2 at a theoretical time position t2 that conforms to the minimum slot interval of n cell slots relative to the preceding cell #1. The CDV tolerance CDVT=k, however, allows this cell #2 to be output at time t1, k slots earlier than the expected time t2. When cell #1 arrives, it can go out of the buffer immediately, because the modified LB count at that time is k and it exceeds the output reference value (zero). The count k is then reduced by (n−1), the difference between Rout=1 and Rmax=n. After that, the count increases by an increment of +1 until it reaches zero at time t1. The total increase amounts to (n−1−k). Now that the count equals the output reference value, cell #2 can be transmitted at time t1.

Let p0 be the point at which the first cell #1 is transmitted. The count then moves down to point p1 that is (n−1) below p0 and then goes up to the output reference value at point p2, which is (n−1−k) above p1. After all, the interval between the first cell output point p0 to the next cell output point p2 is (n−k). That is, by setting the upper limit to k when Rmax=n, Rout=1, and CDVT=k, the LB controller 30-1 allows the distance between two cells #1 and #2 to be (n−k), meaning that cell #2 is transmitted k cell slots earlier than the time determined by the requirement of minimum cell interval. Note that the cell intervals cannot be shorter than (n−k). That is, the upper limit determined with formula (2) ensures conformance to the specified CDVT.

SCR Control

Figure 9:
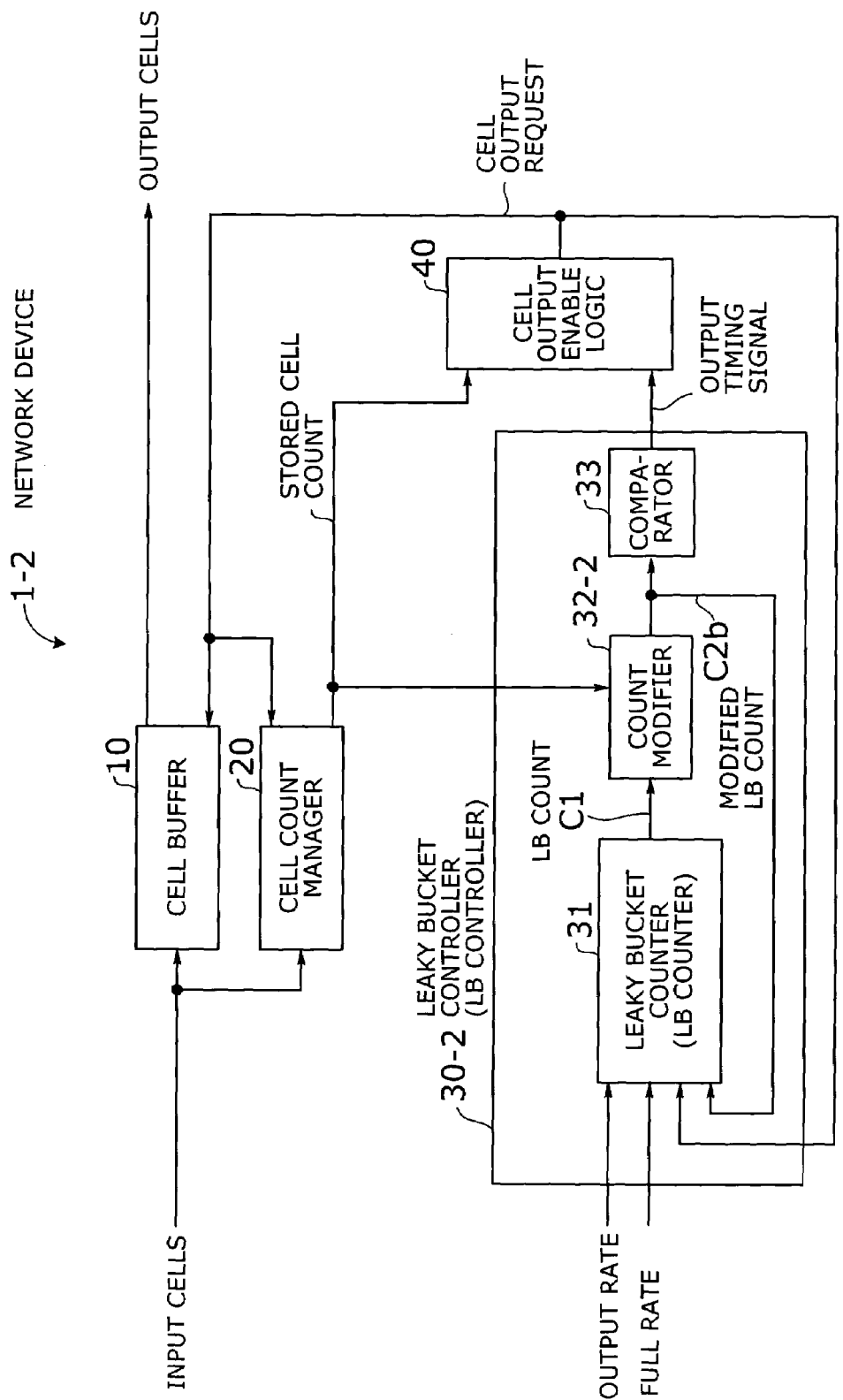
FIG. 9 is a conceptual view of another network device according to the present invention.

This section describes how to shape the traffic in order to conform to a specified sustainable cell rate (SCR). FIG. 9 is a conceptual view of another network device according to the present invention, which is designed to manage the flow of cells at the source end according to a given SCR parameter. To achieve this purpose, the illustrated network device 1-2 has a cell buffer 10, a cell count manager 20, an LB controller 30-2, and a cell output enable logic 40. As the cell buffer 10, cell count manager 20, and cell output enable logic 40 have already been explained in FIG. 1, the following will omit the explanation for them and focus on the other elements.

The LB controller 30-2 is formed from an LB counter 31, a count modifier 32-2, and a comparator 33. The LB counter 31 and comparator 33 have already been described in FIG. 1. The count modifier 32-2, on the other hand, is designed to compare the LB count C1 with a given output reference, unlike the foregoing count modifier 32-1. If C1 exceeds the output reference value, and if the stored cell count is zero, the count modifier 32-2 changes C1 to the output reference. If C1 does not exceed the output reference, or if the stored cell count is one or more, no modification is made to C1. The count modifier 32-2 outputs this C1 as a modified LB count C2b.

Figure 10:
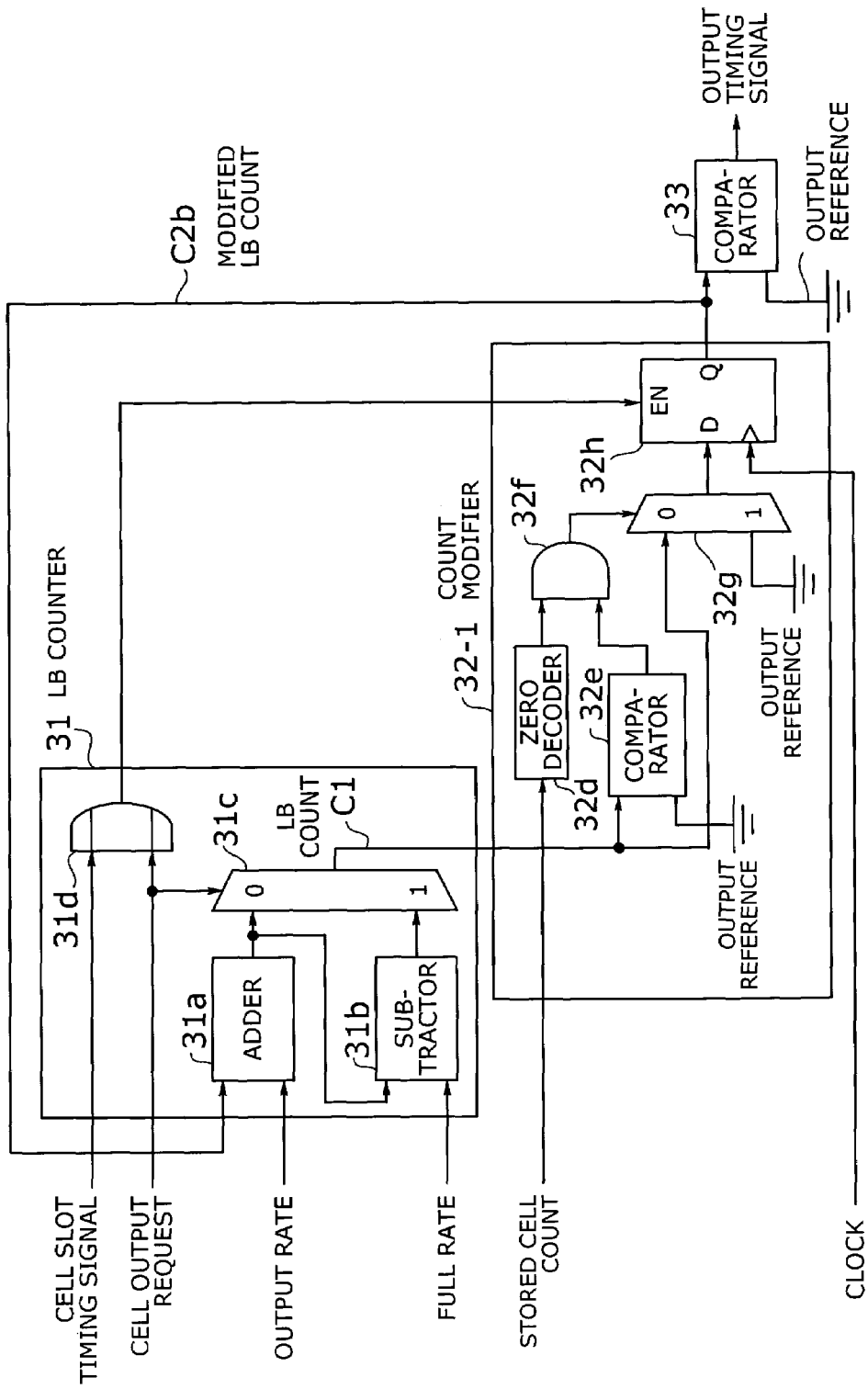
FIG. 10 shows the structure of another LB controller.

Referring now to FIG. 10, the detailed structure of the LB controller 30-2 will be described below. As already mentioned in FIG. 9, the LB controller 30-2 has an LB counter 31, a count modifier 32-2, and a comparator 33. The count modifier 32-2 is formed from a zero decoder 32d, a comparator 32e, a AND gate 32f, a selector 32g, and a register 32h.

The zero decoder 32d outputs a high-level signal when the stored cell count is zero, and otherwise, it outputs a low-level signal. The comparator 32e compares the LB count C1 from the LB counter 31 with an output reference value, which is set to zero in FIG. 10. If C1 is zero or more, the comparator 32e outputs a high-level signal, and otherwise, it outputs a low-level signal. The AND gate 32f produces a logical product between the outputs of the zero decoder 32d and comparator 32e.

The selector 32g receives LB count C1 at port #0 and the output reference value (zero) at port #1. When the AND gate 32f gives a high-level selection signal, the selector 32g chooses its port #1 (i.e., zero-valued output reference). When the selector 32g gives a low-level selection signal, the selector 32g selects its port #0 (i.e., LB count C1).

The register 32h, operating on a clock signal, receives the output of the selector 32g at its D (data) input port. This data is taken into the register 32h when EN (enable) input is driven to a high level by the logical sum output of the OR gate 31d. The latched data appearing at its output port Q is sent to the comparator 33 and adder 31a as a new modified LB count C2b.

The above network device 1-2 of FIGS. 9 and 10 achieves SCR control, i.e., a traffic shaping operation that ensures an average flow rate of ingress cells as specified by an SCR parameter. This feature allows, for example, three cells to be transmitted in a five-slot period, when the full rate is set to 5 and the output rate is set to 3. Conventional SCR control, however, may temporarily produce a burst of cells in response to a sudden increase of ingress data traffic after a long absence thereof, until it can settle into a state where cell are output at a desired average rate. Unlike this conventional control, the network device 1-2 of the present invention prevents a momentary burst from happening in the same situation as above, thus always maintaining a specified average rate of ingress cells.

Figure 11:
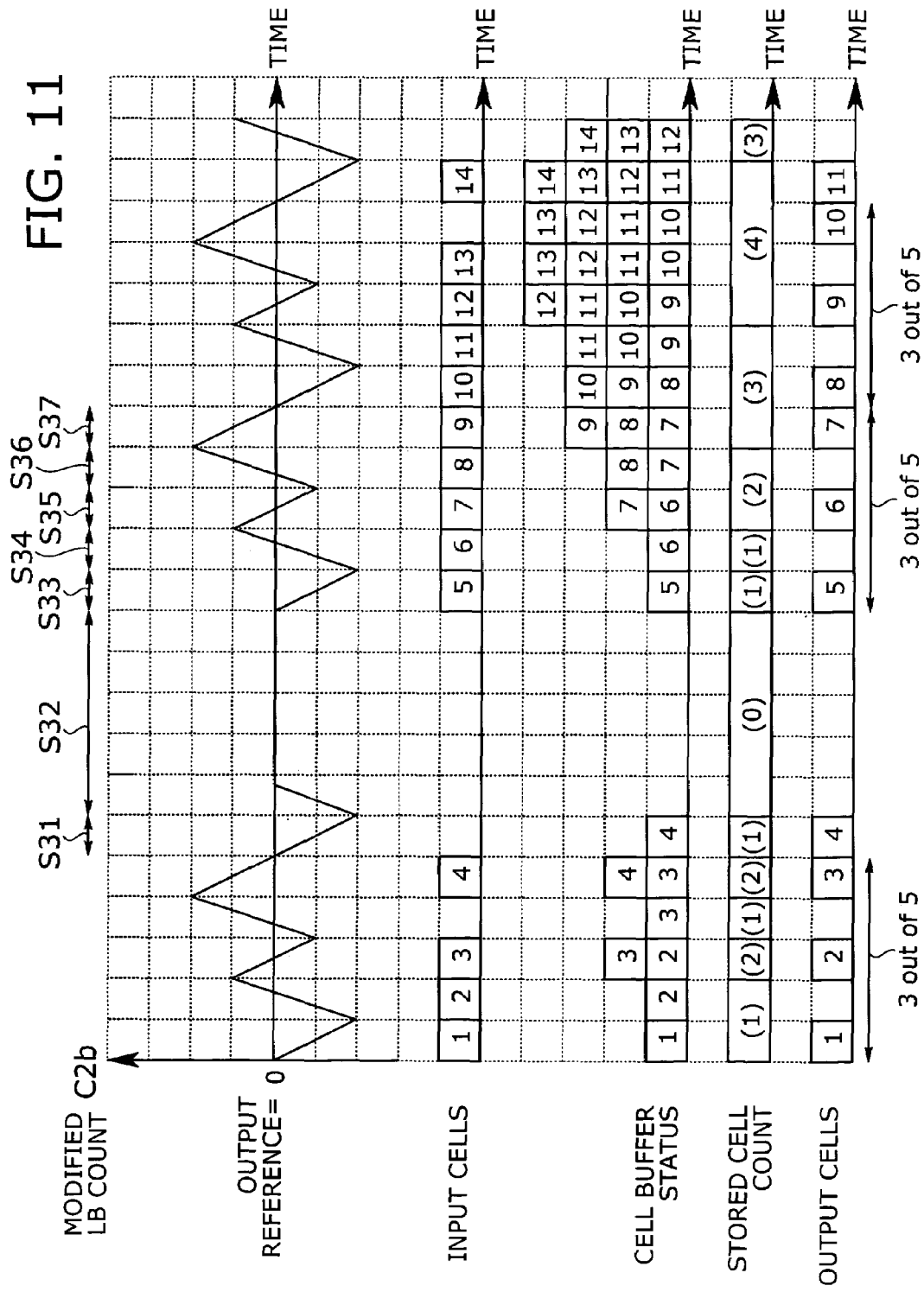
FIG. 11 shows how SCR control is achieved.

FIG. 11 explains SCR control according to the present invention. The upper half of FIG. 11 gives a line graph illustrating how the modified LB count C2b varies with time, while the lower half shows input cells, cell buffer status, stored cell count, and output cells. It is assumed here that the full rate is set to 5 Mbps, and the output rate of 3 Mbps. The following explanation skips the first five cell slots and begins with the outputting of cell #4.

(S31) The cell buffer 10 currently stores one cell #4 as can be seen from the cell buffer status. Since the stored cell count is one at this moment, the count modifier 32-2 permits the present LB count C1=0 to be a new modified LB count C2b, without replacement with the output reference value. This zero-valued C2b satisfies the condition of C2b≧0 at the comparator 33, which enables the cell buffer 10 to output cell #4. The LB counter 31 now adds 3 (output rate parameter) to C2b=0 and then subtracts 5 (full rate parameter) from that sum, thus updating the LB count C1 with a new value of −2.

(S32) There has been no cell traffic for five slots since the last cell was transmitted at step S31. The LB counter 31 repeats adding the output rate value of +3 even in this period, but no subtraction takes place because of the absence of cells to be sent out. The LB count C1 soon reaches the output reference value of zero, after which C1 stays at that level because the count modifier 32-2 keeps choosing the output reference value for C1. This eventually stops the counting operation of the LB counter 31, holding the modified LB count C2b at the level of zero until an active cell output request arises.

(S33) Cell #5 arrives. The cell buffer 10 stores this cell #5, and the stored cell count is set to one again. Since the stored cell count is 1 at this moment, the count modifier 32-1 permits the LB count C1=0 to be output as the modified LB count C2b without modification. This zero-valued C2b satisfies the condition of C2b≧0 at the comparator 33, which enables the cell buffer 10 to output cell #5 immediately. The LB counter 31 now adds 3 to C2b=0 and then subtracts 5 from that sum, thus updating the LB count C1 with a new value of −2.

(S34) Cell #6 arrives. The cell buffer 10 now contains cell #6, and the stored cell count continues to be one. Since the stored cell count indicates 1 at this moment, the count modifier 32-1 permits the present LB count C1=−2 to be output as a new modified LB count C2b without modification. This negative value (−2) of C2b fails to satisfy the condition of C2b≧0 at the comparator 33, which prevents any cells from going out of the cell buffer 10. The LB counter 31 now adds 3 (output rate parameter) to C2b=−2, thus updating the LB count C1 with a new value of +1.

(S35) Cell #7 arrives. The cell buffer 10 now contains two cells #6 and #7, and the stored cell count is set to two. Since the stored cell count indicates 2 at this moment, the count modifier 32-1 permits the present LB count C1=+1 to be output as a new modified LB count C2b without modification. This positive value (+1) of C2b satisfies the condition of C2b≧0 at the comparator 33, thus permitting the cell buffer 10 to output the previously stored cell #6. The LB counter 31 now adds 3 to C2b=0 and then subtracts 5 from that sum, thus updating the LB count C1 with a new value of −1.

(S36) Cell #8 arrives. The cell buffer 10 now contains two cells #7 and #8, and the stored cell count continues to be two. Since the stored cell count indicates 2 at this moment, the count modifier 32-1 permits the present LB count C1=−1 to be output as a new modified LB count C2b without modification. This negative value (−1) of C2b does not satisfy the condition of C2b≧0 at the comparator 33, which prevents any cells from going out of the cell buffer 10. The LB counter 31 now adds 3 to C2b=−1, thus updating the LB count C1 with a new value of +2.

(S37) Cell #9 arrives. The cell buffer 10 now contains three cells #7, #8, and #9. Since the stored cell count indicates 3 at this moment, the count modifier 32-1 permits the present LB count C1=+2 to be output as a new modified LB count C2b without modification. This positive value (+2) of C2b satisfies the condition of C2b≧0 at the comparator 33, which permits the cell buffer 10 to output cell #7. The LB counter 31 now adds 3 to C2b=+2 and then subtracts 5 from that sum, thus updating the LB count C1 with a new value of zero.

As can be seen from the above example, the proposed network device 1-2 prevents a momentary burst from happening even in the case where a series of cells are supplied after a long absence, thus always maintaining a specified average rate of ingress cells.

Network Device with MBS/CDVT/SCR Control

Figure 12:
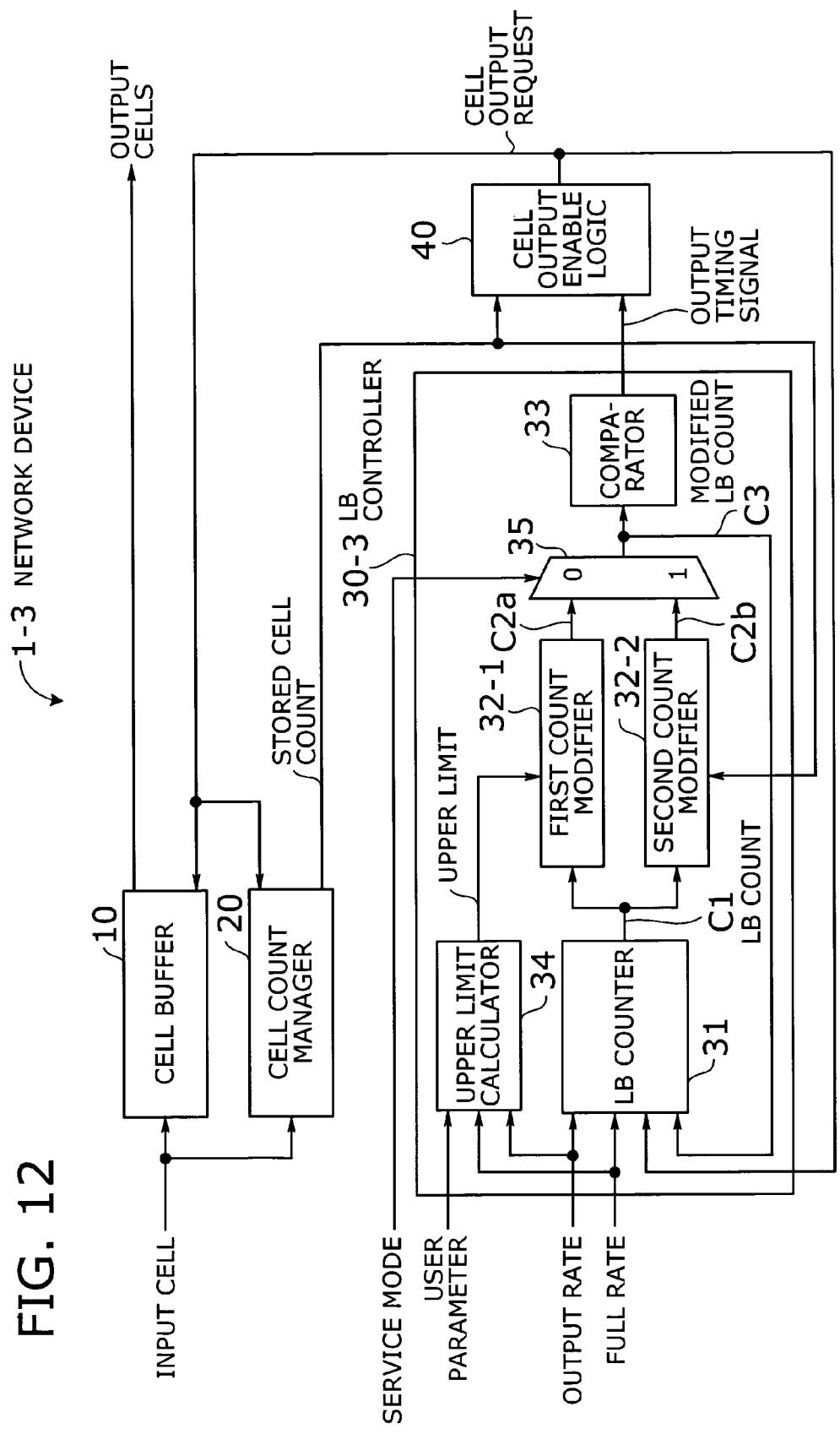
FIG. 12 is a conceptual view of yet another network device according to the present invention.

This section describes a yet another network device according to the present invention, which selects either of MBS, CDVT, and SCR in controlling cell traffic. FIG. 12 is a conceptual view a network device 1-3 designed to control bandwidth usage at the source end. The illustrated network device 1-3 has a cell buffer 10, a cell count manager 20, an LB controller 30-3, and a cell output enable logic 40. As the cell buffer 10, cell count manager 20, and cell output enable logic 40 have already been explained in FIG. 1, the following section will omit the explanation for them and focus on the LB controller 30-3.

The LB controller 30-3 has an LB counter 31, a first count modifier 32-1, a second count modifier 32-2, a comparator 33, an upper limit calculator 34, and a selector 35. The first count modifier 32-1 is equivalent to what has been described earlier as the count modifier 32-1 in FIG. 2, and hence the same reference numeral. The second count modifier 32-2 is equivalent to what has been described as the count modifier 32-2 in FIG. 10, and hence the same reference numeral.

The first and second count modifiers 32-1 and 32-2 produce a first modified LB count C2b and a second modified LB count C2b, respectively. The selector 35 receives C2a at its port #0, as well as C2b at its port #1. Selection is made through a service mode signal provided from an external source (not shown). When this signal indicates MBS/CDVT mode, the first modified LB count C2a at port #0 is selected. When it indicates SCR mode, the second modified LB count C2b at port #1 is selected. The selected value is referred to as a modified LB count C3. This modified LB count C3 is fed back to the LB counter 31 to calculate a new LB count as in the preceding embodiments.

As can be seen from the above, the network device 1-3 of FIG. 12 has two different count modifiers, together with a selection mechanism for them. This structure enables the network device 1-3 to support three traffic service parameters MBS, CDVT, and SCR.

Multiple Connections

Figure 13:
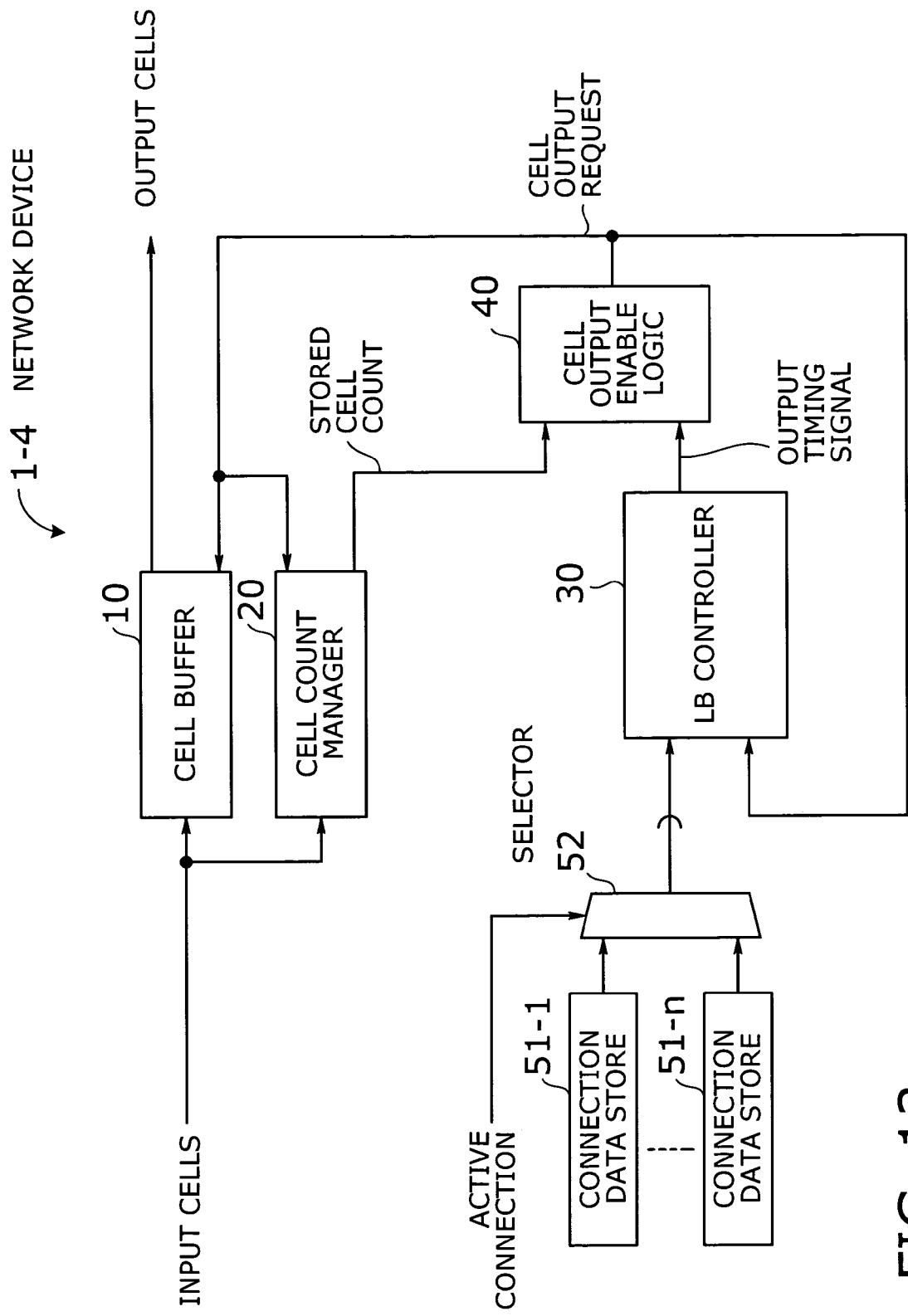
FIG. 13 shows the structure of a network device that supports multiple connections.
Figure 14:
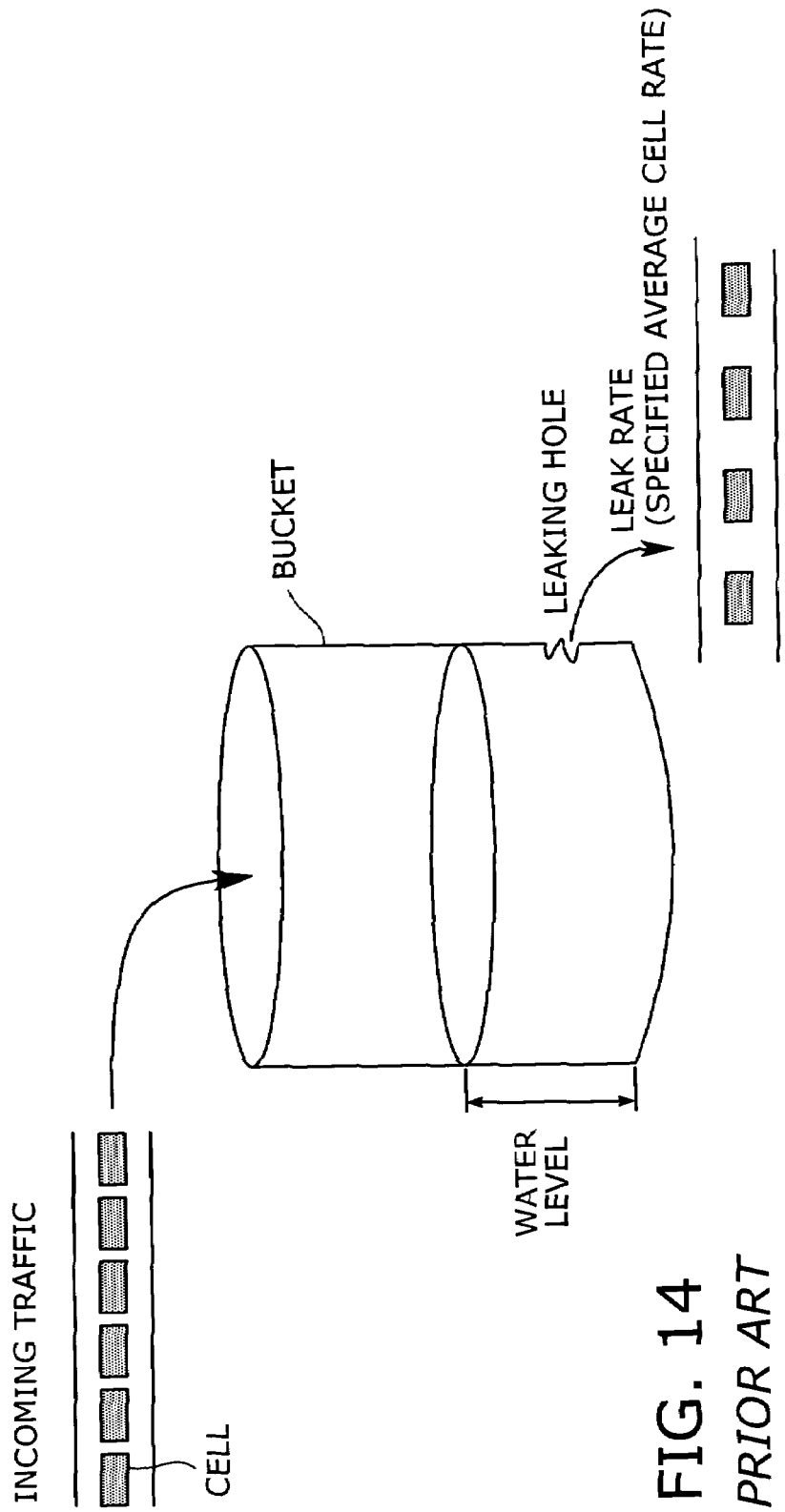
FIG. 14 shows the concept of conventional leaky bucket algorithm.

Referring to FIG. 13, a still another network device according to the present invention will be described. As its distinctive feature, this network device 1-4 has a mechanism to support a plurality of connections. Specifically, the network device 1-4 comprises a cell buffer 10, a cell count manager 20, an LB controller 30, a cell output enable logic 40, a plurality of connection data stores 51-1 to 51-n, and a selector 52. Note that the foregoing network devices 1-1 to 1-3 can also be configured like this to support multiple connections.

The connection data stores 51-1 to 51-n contain a connection dataset for each individual connection, whose contents include an output rate parameter, a full rate parameter, and a user parameter. With an active connection specified, the selector 52 chooses one of the connection data stores to supply the corresponding connection dataset to the LB controller 30. It may also be possible to configure the circuit such that the connection data stores 51-1 to 51-n deliver their contents to the LB controller 30 in a time-sharing manner. In either way, the network device can shape the cell traffic independently of a plurality of connections.

Packet Network Application

This section explains how the present invention can be applied to packet transport on an Internet Protocol (IP) network. The proposed network devices 1-1 to 1-4 have been described as ingress nodes that transmit fixed-length cells over an ATM network. The MBS/CDVT/SCR control of the present invention, however, can also be implemented in IP packet networks. The following explanation is directed to how the LB controller should be modified to handle IP packets.

One primary difference between ATM cells and IP packets lies in their size. IP packets convey variable-length data, whereas ATM cells carry fixed-length data. Every ATM cell is 53 bytes in length. Suppose now that the cell slot time (interval for the LB controller to determine whether to transmit a cell) is 2.7 μs, the output rate is 10 Mbps, and the full rate is 150 Mbps. Operating at a resolution of 1 bps, the LB controller 30 adds 10,000,000 (output rate parameter) to LB count at the intervals of 2.7 μs, and subtracts therefrom 150,000,000 (full rate parameter) each time a cell is transmitted.

In order to handle a variable-length IP packet instead of an ATM cell, the full rate parameter has to be scaled according to the actual packet length before it is subtracted from the output of the adder 31a. Think of an IP packet with a length of 53 bytes, for example. The subtrahend is 150,000,000 in this case, which is the same as in the case of ATM cells. Think of another IP packet with a length of 106 bytes (=53×2). Then the subtrahend will be 300,000,000 (=150,000,000×2). As seen from those examples, the subtrahend has to be recalculated each time a new packet is transmitted.

The present invention can thus be used to shape the ingress traffic of variable-length IP packets by changing the subtrahend in proportion to the packet length each time a packet is transmitted. Accordingly, once a packet that is twice as long as the previous one is transmitted, the next packet has to wait twice as long before it can be transmitted. This is exactly what a leaky bucket shaper is supposed to do.

CONCLUSION

As can be seen from the above explanation, the present invention offers a traffic shaping mechanism based on the leaky bucket algorithm. The proposed mechanism manages bandwidth usage by controlling the upper limit of LB count values that the LB counter produces. Besides making it possible to provide traffic services satisfying various user requirements, the present invention eliminates the need for dedicated circuits to support MBS, CDVT, and SCR, thus reducing circuit size and improving processing speeds.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A network device having bandwidth control functions to transport cells, comprising:
   (a) a cell buffer that stores received cells and outputs one of the stored cells each time a cell output request signal becomes active;
   (b) a cell count manager that provides a stored cell count indicating the number of cells stored in said cell buffer;
   (c) a leaky bucket controller that controls bandwidth usage at a source end by using a leaky bucket algorithm, comprising:
   a leaky bucket counter that calculates a leaky bucket (LB) count at predetermined cell slot intervals by adding an output rate parameter to a modified LB count, and by subtracting therefrom a full rate parameter if the cell output request signal is active,
   an upper limit calculator that determines an upper limit for the LB count,
   a count modifier that produces a new value of the modified LB count by limiting the LB count not to exceed the upper limit, and
   a comparator that activates an output timing signal when the modified LB count from the count modifier equals or exceeds an output reference value; and
   (d) a cell output enable logic that activates the cell output request signal when the output timing signal is active and when the stored cell count is one or more.

2. The network device according to claim 1, wherein:
said leaky bucket controller controls ingress cells that are transmitted in a burst; and
said upper limit calculator calculates the upper limit Lmax as $$Lmax = (Rmax - Rout) \times (MBS \times 1)$$

where MBS represents maximum burst size given as a user parameter, Rout is an output rate parameter, and Rmax is a full rate parameter.

3. The network device according to claim 1, wherein:
said leaky bucket controller permits cell delay variations; and
said upper limit calculator calculates the upper limit Lmax as $$Lmax = Rout \times \frac{CDVT}{T}$$

where CDVT is a cell delay variation tolerance given as a user parameter, Rout is an output rate parameter, and T represents a cell slot interval.

4. The network device according to claim 1, wherein:
the cells are variable-length packets; and
said leaky bucket controller updates the LB count each time a packet is transmitted, by adding the output rate parameter to the modified LB count, and by subtracting therefrom the full rate parameter scaled according to an actual packet length.

5. The network device according to claim 1, further comprising:
a plurality of connection data stores containing a connection dataset for each of a plurality of connections, the connection datasets each including at least one of an output rate parameter, a full rate parameter, and a user parameter; and
a selector that selects one of the connection data stores corresponding to a specified connection and supplies said leaky bucket controller with the connection dataset contained in the selected connection data store.

6. A network device having bandwidth control functions to transport cells, comprising:
  (a) a cell buffer that stores received cells and outputs one of the stored cells each time a cell output request signal becomes active;
  (b) a cell count manager that provides a stored cell count indicating the number of cells stored in said cell buffer;
  (c) a leaky bucket controller that controls bandwidth usage at a source end by using a leaky bucket algorithm, comprising:
    a leaky bucket counter that calculates a leaky-bucket (LB) count at predetermined cell slot intervals by adding an output rate parameter to a modified LB count, and by subtracting therefrom a full rate parameter if the cell output request signal is active,
    a count modifier that produces a new value of the modified LB count by limiting the LB count not to exceed an output reference value when the LB count has reached the output reference value and when the stored cell count is zero, and
    a comparator that activates an output timing signal when the modified LB count from the count modifier equals or exceeds the output reference value; and
  (d) a cell output enable logic that activates the cell output request signal when the output timing signal is active and when the stored cell count is one or more.

7. The network device according to claim 6, wherein:
  the cells are variable-length packets; and
  said leaky bucket controller updates the LB count each time a packet is transmitted, by adding the output rate parameter to the modified LB count, and by subtracting therefrom the full rate parameter scaled according to an actual packet length.

8. The network device according to claim 6, further comprising:
  a plurality of connection data stores containing a connection dataset for each of a plurality of connections, the connection datasets each including at least one of an output rate parameter, a full rate parameter, and a user parameter; and
  a selector that selects one of the connection data stores corresponding to a specified connection and supplies said leaky bucket controller with the connection dataset contained in the selected connection data store.

9. A network device having bandwidth control functions to transport cells, comprising:
  (a) a cell buffer that stores received cells and outputs one of the stored cells each time a cell output request signal becomes active;
  (b) a cell count manager that provides a stored cell count indicating the number of cells stored in said cell buffer;
  (c) a leaky bucket controller that controls bandwidth usage at a source end by using a leaky bucket algorithm, comprising:
    a leaky bucket counter that calculates a leaky-bucket (LB) count at predetermined cell slot intervals by adding an output rate parameter to a modified LB count, and by subtracting therefrom a full rate parameter if the cell output request signal is active,
    an upper limit calculator that determines an upper limit for the LB count,
    a first count modifier that produces a first modified LB count by limiting the LB count not to exceed the upper limit,
    a second count modifier that produces a second modified LB count by limiting the LB count not to exceed an output reference value when the LB count has reached the output reference value and when the stored cell count is zero,
    a selector that selects either the first modified LB count or the second modified LB count, depending on a given service mode, and
    a comparator that activates an output timing signal when the first or second modified LB count selected by said selector equals or exceeds the output reference value; and
  (d) a cell output enable logic that activates the cell output request signal when the output timing signal is active and when the stored cell count is one or more.

10. The network device according to claim 9, wherein:
  said leaky bucket controller controls ingress cells that are transmitted in a burst; and
  said upper limit calculator calculates the upper limit Lmax as Lmax=(Rmax−Rout)×(MBS−1)

where MBS represents maximum burst size given as a user parameter, Rout is an output rate parameter, and Rmax is a full rate parameter.

11. The network device according to claim 9, wherein:
  said leaky bucket controller permits cell delay variations; and
  said upper limit calculator calculates the upper limit Lmax as $$Lmax = Rout \times \frac{CDVT}{T}$$

where CDVT is a cell delay variation tolerance given as a user parameter, Rout is an output rate parameter, and T represents a cell slot interval.

12. The network device according to claim 9, wherein:
  the cells are variable-length packets; and
  said leaky bucket controller updates the LB count each time a packet is transmitted, by adding the output rate parameter to the modified LB count, and by subtracting therefrom the full rate parameter scaled according to an actual packet length.

13. The network device according to claim 9, further comprising:
  a plurality of connection data stores containing a connection dataset for each of a plurality of connections, the connection datasets each including at least one of an output rate parameter, a full rate parameter, and a user parameter; and
  a selector that selects one of the connection data stores corresponding to a specified connection and supplies said leaky bucket controller with the connection dataset contained in the selected connection data store.

14. A method for controlling bandwidth usage at a source end by using a leaky bucket algorithm, comprising the steps of:
  (a) calculating a leaky-bucket (LB) count at predetermined cell slot intervals by adding an output rate parameter to a modified LB count, and by subtracting therefrom a full rate parameter if a cell output request signal is active,
  (b) setting at least one of maximum burst size, cell delay variation tolerance, and sustainable cell rate;

(c) calculating an upper limit for the LB count when the maximum burst size or cell delay variation tolerance is set at said setting step (b);
(d) producing a first modified LB count by limiting the LB count not to exceed the upper limit;
(e) comparing the LB count with an output reference value when the sustainable cell rate is set at said setting step (b);
(f) producing a second modified LB count by limiting the LB count not to exceed the output reference value when the LB count has reached the output reference value and when the stored cell count is zero; and
(g) outputting a cell when the first or second modified LB count equals or exceeds the output reference value.

15. The method according to claim 14, wherein:
the maximum burst size parameter is given as a user parameter; and
the upper limit Lmax for controlling bursts is calculated as $$Lmax = (Rmax - Rout) \times (MBS - 1)$$

where MBS is the given maximum burst size, Rout is an output rate parameter, and Rmax is a full rate parameter.

16. The method according to claim 14, wherein:
the cell delay variation tolerance is given as a user parameter; and
the upper limit Lmax for controlling cell delay variations is calculated as $$Lmax = Rout \times \frac{CDVT}{T}$$

where CDVT is the given cell delay variation tolerance, Rout is an output rate parameter, and T represents a cell slot interval.

17. The method according to claim 14, wherein:
the cells are variable-length packets; and
said step (a) of calculating the LB count updates the LB count each time a packet is transmitted, by adding the output rate parameter to the modified LB count, and by subtracting therefrom the full rate parameter scaled according to an actual packet length.

18. The method according to claim 14, further comprising the steps of:
storing a plurality of connection datasets each including at least one of an output rate parameter, a full rate parameter, and a user parameter for each different connection; and
selecting one of the connection datasets that corresponds to a specified connection for use in said step (a) of calculating the LB count, as well as in said step of calculating the upper limit.

* * * * *